United States Patent Office 3,488,066
Patented Jan. 6, 1970

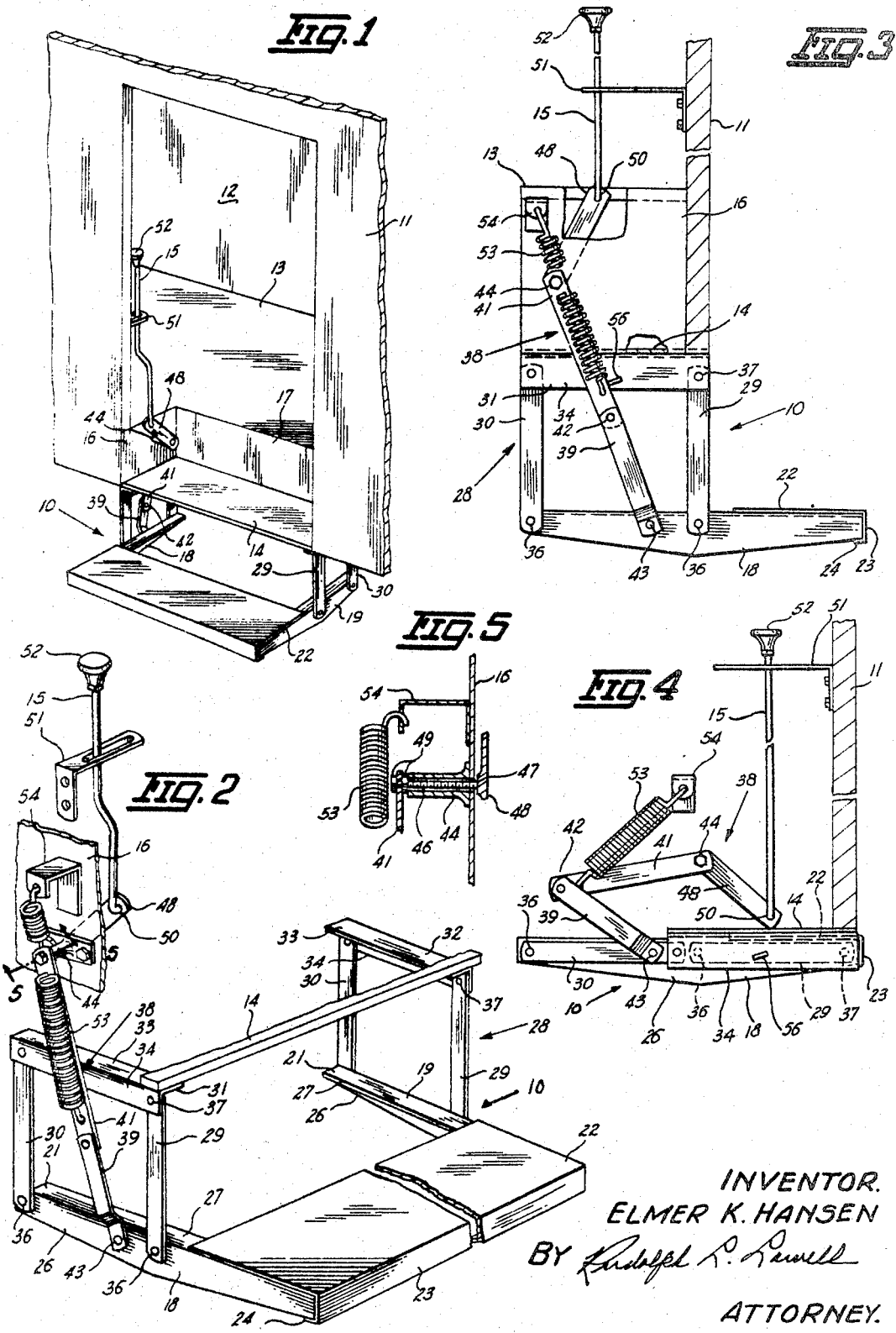
Jan. 6, 1970 — E. K. HANSEN — 3,488,066
RETRACTABLE AND EXTENDIBLE STEP ASSEMBLY FOR VEHICLES
Filed Nov. 22, 1968
INVENTOR.
ELMER K. HANSEN
BY Rudolph L. Lowell
ATTORNEY.

3,488,066
RETRACTABLE AND EXTENDIBLE STEP
ASSEMBLY FOR VEHICLES
Elmer K. Hansen, 801 S. Martha, Sioux City, Iowa 51106
Filed Nov. 22, 1968, Ser. No. 778,275
Int. Cl. B60r 3/02
U.S. Cl. 280—163                    2 Claims

ABSTRACT OF THE DISCLOSURE

The retractable step assembly is used in conjunction with a fixed inset step provided in a vehicle body of a mobile home unit for movement, by a mutually operated handle within the vehicle body, to a retracted horizontal position located below and adjacent the under side of the fixed step and to an extended horizontal position located forwardly and downwardly from the fixed step. The step assembly is moved to and yieldably held in its moved positions by a toggle lever assembly that is actuated by the manually operated handle.

SUMMARY OF THE INVENTION

The retractable step is of a simple and compact construction and is readily movable to a retracted storage position or to an operating position by a handle member conveniently located within the vehicle body adjacent a vehicle doorway to which the retractable step gives access. The step assembly includes a pair of longitudinally spaced rearwardly projected frame members that are interconnected with a fixed step by a parallel link system. An upright mounting plate or wall member at one end of the fixed step supports a rock shaft having a rock arm at one end located above the fixed step for connection with the operating handle. A toggle lever assembly has one end fixed to the other end of the rock shaft and its opposite end pivotally connected to one of the frame members of the retractable step. On operation of the handle member the toggle assembly is actuated to move the parallel link system to positions defining the extended and retracted positions of the retractable step and cooperates with a spring means to releasably lock the step in such positions. The location of only the rock arm and operating handle within the vehicle body provides for an unobstructed stairway, and the retraction of the retractable step to a position located below and adjacent the under side of the fixed step prevents dirt and mud from accumulating on the top surface of the retractable step along with substantially concealing the step within the confines of the vehicle body.

DETAIL DESCRIPTION OF THE INVENTION

With reference to the drawings:

FIG. 1 is a perspective view of a portion of a vehicle body having a doorway and an inset fixed step showing the retractable step of this invention in assembly relation therewith;

FIG. 2 is a foreshortened perspective view of the retractable step assembly showing the step in its extended position;

FIG. 3 is a side elevational view of the retractable step assembly shown in its extended position;

FIG. 4 is illustrated similarly to FIG. 3 and shows the step assembly in its retracted position; and FIG. 5 is a detail sectional view as seen along the line 5—5 in FIG. 2.

Referring to the drawings the retractable step assembly, indicated generally at 10 in FIG. 1, is shown in assembly relation with a body 11 for a vehicle such as a camper or mobile home unit that includes a door opening 12 closeable by an outwardly swinging door (not shown). The vehicle body 11 includes a floor 13 and an inset fixed step 14 located below the surface of the floor 13 and inwardly of the door opening 12.

The fixed step 14 has upright end members or walls 16 (only one of which is shown) and a back wall member 17 that are joined with the floor 13 to form a step-down within the floor area of the vehicle body. The retractable step assembly 10 is movably supported from the fixed step 14 for movement by an operating handle 15 to an extended horizontal position located forwardly and downwardly from the fixed step 14, as shown in FIG. 1, to a retracted horizontal position located below and adjacent the fixed step 14, as shown in FIG. 4.

The retractable step assembly 10 (FIG. 2) includes a pair of longitudinally spaced end frame members 18 and 19 of a right angle shape in transverse cross section arranged in a facing relation so as to have horizontal upper legs 21 extended inwardly toward each other. A step member 22 of a sheet plate material is secured, as by welding, to the top of the forward sections of the upper legs 21 and is formed with a front downwardly projected section 23 that extends over the front surfaces of the frame members 18 and 19 and terminates in a rearwardly projected lip 24 that extends under the vertical legs 26 of the frame members 18 and 19. The rear sections 27 of the frame members 18 and 19 project rearwardly of the step member 22 a distance that is substantially equal to the transverse dimension of the step member 10.

The retractable step member 22 is pivotally supported from the fixed step member 14 by a parallel link system 28 that includes oppositely arranged pairs of link members 29 and 30 which are spaced longitudinally of the frame member rear sections 27. A pair of angle members 31 and 32, corresponding to the rear end sections 27, have horizontal legs 33 secured, as by welding, to the under side of the fixed step 14 and depending vertical legs 34 that are spaced outwardly from the corresponding vertical legs 26 of the frame members 18 and 19 a distance which is a little greater than the thickness of the links 29 and 30.

The lower end of each link member 29 and 30 is pivotally connected at 36 to the vertical leg 26 of a corresponding rear section 27 and the upper end of each link member 29 and 30 is pivotally connected at 37 to a corresponding vertical leg 34 of the angle members 31 and 32. As best appears in FIG. 2, the links 29 and 30 are positioned to the outside of the vertical legs 26 of the frame members 18 and 19 and to the inside of the vertical legs 34 of the angle members 32.

As thus far described it is seen that the step member 22 is in its extended position, shown in FIGS. 2 and 3 when the links 29 and 30 are vertically positioned and in a retracted position between the angle members 31 and 32 and adjacent the under side of the fixed step 14 when the links 29 and 30 are projected horizontally and rearwardly from their pivot connections 37 with the angle members 31 and 32.

For moving and releasably locking the step member 22 in its retracted and extended positions there is provided a toggle lever assembly 38 (FIGS. 2 and 4) that includes a pair of levers 39 and 41 of unequal length having their inner ends pivotally connected together by a pivot or hinge connection 42. The shorter or lower lever 39 has its outer end pivotally connected at 43 to the vertical leg 26 of the frame member 18 at a position adjacent to and rearwardly of a link 29. The outer end of the upper or long lever 41 is fixed to one end of a shaft 44 that extends laterally of the lever 41.

As shown in FIG. 5 an end wall 16 of the fixed step 14 is provided with a laterally projected hub or bearing 46. The shaft 44 which is illustrated as a bolt member, is rotatably supported in the bearing 46 with one end 47 extended through the end wall or mounting member 16 so as to be positioned over the fixed step 14. Fixed on the shaft end 57 is a rock arm 48. The lever 41 is rigidly secured to the opposite end of the shaft 44 by lock nuts 49 so as to be rotatable as a unit with the shaft. The end wall 16 thus functions as a mounting plate for the shaft 44 and as a separating wall between the toggle assembly 38 and the rock arm 48. The free end of the rock arm is pivotally connected at 50 to the lower end of manually operated rod or handle 15 that is located within the vehicle body 11 and movably supported for up and down movement in a guide member 51 that is secured to the side wall of the vehicle body 11 at a position adjacent the door opening 12. A hand grip or knob 52 is mounted at the top end of the operating rod 15.

A coil spring 53 that forms part of the toggle lever assembly 38 is connected at one end to the long lever 41 at a position adjacent the hinge connection 42 and has its other end connected to a bracket 54 that is secured to and projects laterally from the end wall 16 at a position above and rearwardly of the shaft 44.

In the use of the retractable step assume that it is in the retracted position shown in FIG. 4. To extend the step 22 of the operating rod 15 is moved upwardly to its position shown in FIG. 3. During this upward movement of the rod or handle 15 the rock arm 48 and lever 41 function as a bell crank that is fixed to the shaft 44, and the toggle levers 39 and 41 are moved to positions in an end to end relation to provide for a vertical positioning of the ling members 29 and 30. This end to end relation of the levers 39 and 41 is defined by the engagement of the lever 41 with a stop member 56 carried on the vertical leg 34 of the angle member 31 to provide for the hinge connection 42 being moved to an over-center position located forwardly of a plane extended through the pivot connection 43 of the short lever 39 and the shaft 44. This over-center position of the hinge connection 42 is maintained by the coil spring 53 the axis of which is in substantial longitudinal alignment with the lower lever 39.

To retract the step member 22 the operating rod 15 is moved downwardly from its position in FIG. 3 to the position shown in FIG. 4. As a result of this rod movement the over-center position of the hinge connection 42 is broken and the step 22 is horizontally moved in a rearward direction until the link members 29 and 30 are extended horizontally from their upper pivot connections 37. The step member 22 and link members 29 are thus located between the vertical legs 34 of the angle members 31 and 32 at positions immediately adjacent the lower surface of the fixed step 14, and the links 30 are extended rearwardly from the angle members 32. This retracted position of the step member 22 is defined by the engagement of the link members 29 with the horizontal legs 33 of the angle members 31 and 32.

In the retracted position of the step member 22 the toggle levers 39 and 41 are in a forwardly diverged relation relative to the hinge connection 42 which is in an over-center relation, relative to the lever 41, and located rearwardly of a plane extended through the pivot connection 43 and the shaft 44. This over-center position of the hinge connection 42 is yieldably maintained by the coil spring 53 which acts to hold the lever 39 against downward movement to release the link members 29 and 30 from their horizontally extended position.

The toggle lever assembly 38 thus functions as an actuating means relative to the parallel link system 28 to provide, in response to operation of the rod 15, for the movement of the step member 22 to its retracted and extended positions and to releasably lock the step member 22 in such positions.

I claim:

1. A retractable step assembly for a vehicle body having a fixed step comprising:
   (a) a step member foldable to a retracted horizontal position located below and adjacent said fixed step and extendible to a horizontal position located downwardly and forwardly from said fixed step, said step member including a pair of longitudinally spaced frame members having rearwardly projected extentions,
   (b) pairs of oppositely arranged link members pivoted at one of the ends thereof to said fixed step and at the opposite ends thereof to corresponding ones of said extension to form a parallel link system for supporting said step member,
   (c) means for releasably locking the retractable step in the retracted and extended positions therefor including a toggle lever assembly comprised of a pair of lever members and a hinge connection interconnecting said pair of lever members at the inner ends thereof,
   (d) means pivotally connecting the outer end of a first one of said levers to one of said extensions,
   (e) shaft means projected laterally from the outer end of the second one of said levers rotatably supported on said vehicle body,
   (f) a manually actuated rock arm on said shaft means,
   (g) a coil spring interconnecting said vehicle body and the second lever for yieldably biasing the inner end of said second lever in an upward direction,
   (h) said link members, on rotation of said rock arm in one direction, being movable to vertically upright positions to move said retractable step to the extended position therefor concurrently with the movement of said lever members to positions in an end to end relation wherein said hinge connection is located forwardly of a plane extended through the axes of said shaft means and the pivot connection at the outer end of said first lever member, and
   (i) stop means on said fixed step engageable with said second lever member to hold the link members in said vertical positions against forward pivotal movement,
   (j) said link members, on rotation of the rock arm in an opposite direction, being pivotally moved to horizontal rearwardly extended positions wherein said hinge connection is located rearwardly of said plane and said lever members are diverged forwardly from said hinge connection.

2. The retractable step assembly according to claim 1 including:
   (a) an upright mounting member at one end of said fixed step,
   (b) said shaft means projected through said mounting member and said rock arm and toggle lever assembly carried on said shaft means at opposite sides of said mounting member with the rock arm above said fixed step,
   (c) an upright operating handle having a lower end pivotally connected to the free end of said rock arm, and
   (d) means movably supporting the handle member on said vehicle body for up and down movement.

(References on following page)

References Cited

UNITED STATES PATENTS

| | | | |
|---|---|---|---|
| 616,230 | 12/1898 | Griffith | 105—448 |
| 1,020,254 | 3/1912 | Blake | 105—448 |
| 1,063,643 | 6/1913 | Blake | 105—448 |
| 1,129,238 | 2/1915 | Seitz | 105—448 |
| 1,180,215 | 4/1916 | Weiss | 280—166 |
| 1,189,595 | 7/1916 | McCarthy | 105—448 |
| 2,761,029 | 8/1956 | Peabody | 267—1 |
| 2,908,032 | 10/1959 | Hatch | 267—1 |

LEO FRIAGLIA, Primary Examiner

ROBERT R. SONG, Assistant Examiner